Sept. 27, 1960    W. A. HYLAND ET AL    2,953,999
SHUT-OFF SLIDE CONTROL FOR GRAIN DRILLS
Filed Aug. 17, 1956    2 Sheets-Sheet 2
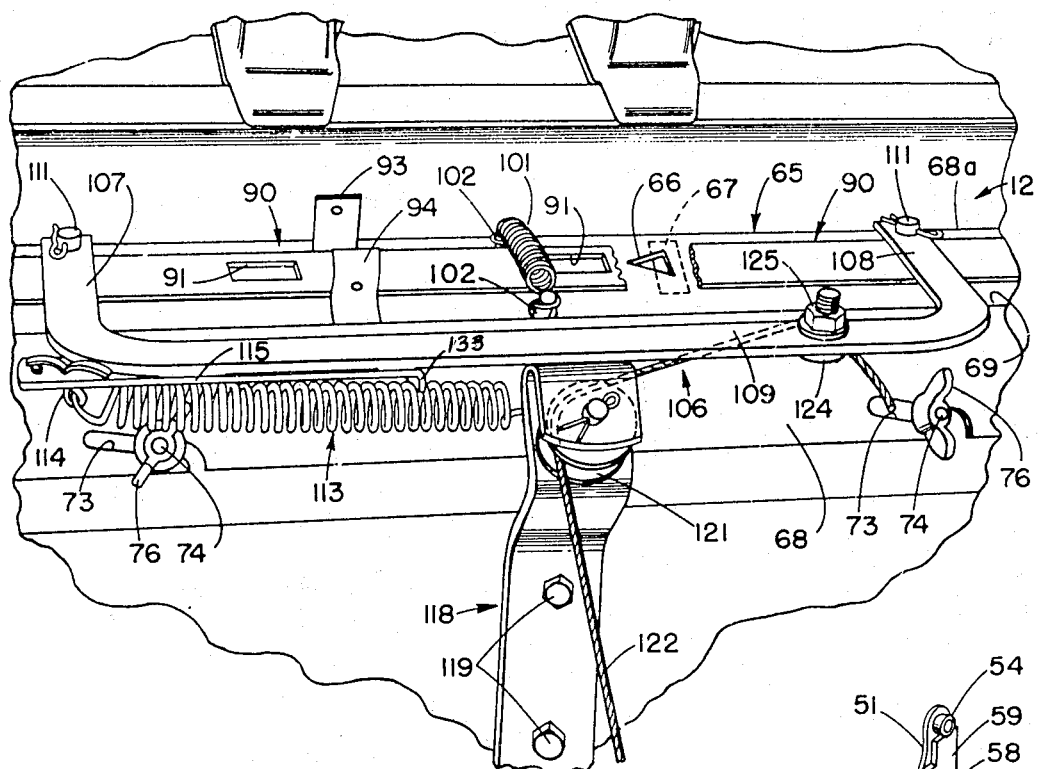
FIG. 2
FIG. 3
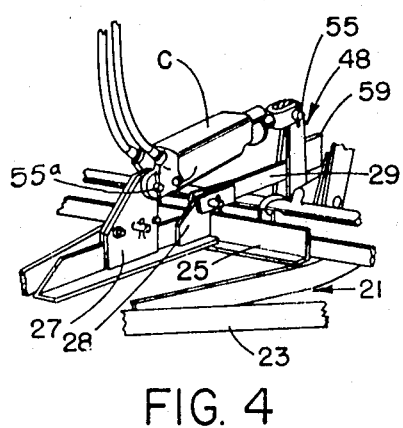
FIG. 4
WILLIAM A. HYLAND
ERNST E. SCHNELL    INVENTORS
ATTORNEYS United States Patent Office 2,953,999
Patented Sept. 27, 1960

2,953,999

SHUT-OFF SLIDE CONTROL FOR GRAIN DRILLS

William A. Hyland, Horicon, and Ernst E. Schnell, West Bend, Wis., assignors, by mesne assignments, to Deere & Company, a corporation of Delaware Filed Aug. 17, 1956, Ser. No. 604,809

8 Claims. (Cl. 111—67)

The present invention relates generally to agricultural implements and more particularly to such machines as grain drills or other material dispensing units.

The objects and general nature of the present invention is the provision of a material dispenser having means to automatically shut off the flow of material when the implement is raised into a transport position. More specifically, it is a feature of this invention to provide material dispensing means that includes a slidable shut-off member that may be opened and closed, and is normally opened during operation but may be closed automatically by the raising of the furrow opener means to a non-operating position.

More specifically, it is an important feature of this invention to provide a shut-off slide having spring means for normally shifting the latter into an open or operating position and cable means adapted to shift the slide in the other direction, against the tension of said spring means, for closing the slide so as to shut off all flow, and a further important feature of this invention is the provision of means connecting the shut-off cable to the furrow opener raising means so that when such means is raised, the shut-off slide is automatically closed.

Also, it is a further feature of this invention to provide means whereby the shut-off slide may be closed irrespective of the position of the furrow opener means.

These and other objects and advantages of the present invention will be apparent to those skilled in the art after a consideration of the following detailed description, taken in conjunction with the accompanying drawings, in which:

Fig. 2 is a fragmentary view of the bottom side of the grain drill hopper, showing the material controlling adjustable bottom slide and the shut-off slide carried on the bottom slide.

Fig. 3 is a fragmentary detail view, with certain portions broken away, showing the transport link in locked position.

Fig. 4 is a fragmentary perspective view showing the raising and lowering power cylinder mounted in operative position.

Figure 1:
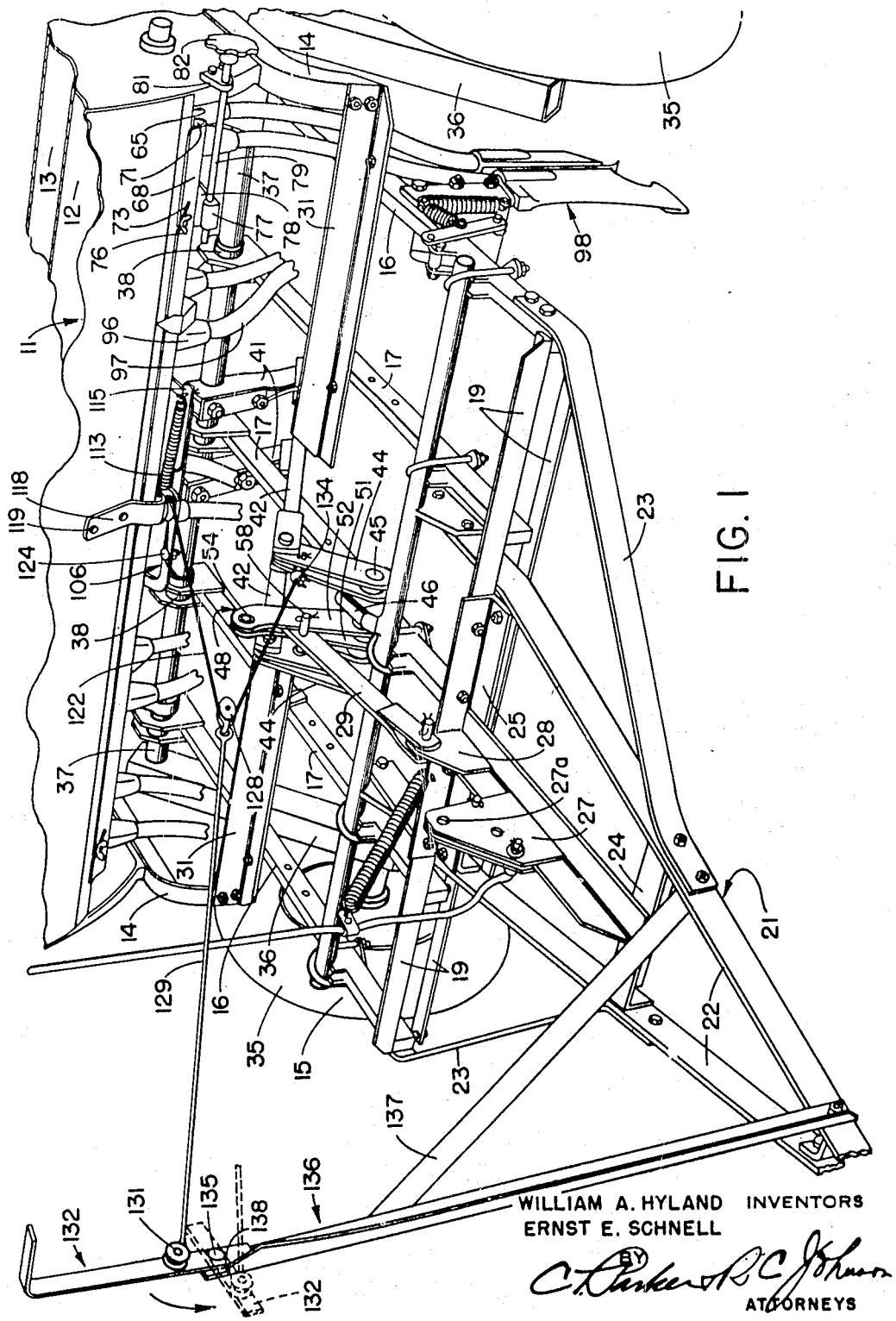
Fig. 1 is a perspective view of a grain drill in which the principles of the present invention have been incorporated.

For purposes of illustration, the present invention has been shown as incorporated in a grain drill having a hopper 11 the forward portion 12 of which is arranged to receive fertilizer and the rear portion 13 of which is arranged to receive seed. The hopper is supported by end members 14 on a grain drill frame 15. The frame 15 includes a pair of end bars 16 and a plurality of intermediate fore-and-aft extending bars 17, the forward ends of said bars being connected to front cross frame members 19. Also connected to the latter members, and to the associated portions of the fore-and-aft extending bars 16 and 17, is a draft frame 21 that comprises a pair of forwardly converging bars 22, with suitable diagonal bracing bars 23 and transverse angles 24 and 25. The latter members support a cylinder-receiving bracket 27 and a rear apertured bracket 28 that is adapted to receive a lockup link 29 when the cylinder is detached from the implement. The frame 15 also includes intermediate transverse angles 31 that are secured to the associated fore-and-aft extending bars 16 and 17, and the angles 31, at their outer ends, receive the associated end members 14.

The frame 15 is supported on a pair of ground wheels 35 that are journaled on axles fixed to the lower ends of a pair of downwardly and forwardly extending crank axle arms 36. The upper end of each of the arms 36 is fixed to a transverse shaft section 37, there being two such sections and the sections are disposed in axial alignment, being received by suitable bearing means for rocking movement relative to the rear portion of the frame 15. Preferably, the bearing means, indicated at 38, are fixed to the rear ends of the fore-and-aft extending frame bars 16 and 17. Secured to the adjacent or innermost portion of each of the axle sections 37 is an arm 41 that extends generally downwardly, each arm receiving the rear lower end of a generally fore-and-aft extending lift link 42. The forward ends of the two lift links 42 are connected to the upper ends of a pair of arms 44 that are secured to a stub shaft 45 supported by bearing means 46 carried by the central frame bar 17. Secured to the generally central portion of the stub shaft is a cylinder-receiving arm 48, made up of two arm sections 51 and 52 between which the lockup link 29, mentioned above, is disposed. The upper end of each of the arm sections 51 and 52 is apertured to receive a cross bushing 54. As shown in Fig. 4, a power cylinder C is connected between the bracket 27 and the arm 48 when the grain drill is to be operated, but when, as shown in Fig. 1, the grain drill is to be disconnected from the tractor the cylinder C is first fully extended and the lockup link 29 is then connected to hold the ground wheels in their transport position (Fig. 1). The parts are so arranged that when the cylinder is fully extended it may readily be connected between the bracket 27, which is provided with a pin-receiving opening 27a, and the arm 48. Preferably, a quick detachable pin 55 is adapted to connect the rear or piston end of the cylinder C to the bushing 54 in the outer end of the arm 48 and a similar pin 55a connects the other end of the power unit C to the bracket 27 at the opening 27a.

When the cylinder C is to be removed, the cylinder is first extended its maximum amount, and then a locking pin 58 is removed from the bracket 27 and inserted in an opening in the lockup link 29 just in front of the rear arm 48, as shown in Figs. 1 and 3. In this position, a lug or abutment plate 59 cooperates with the bushing 54 so that the link 29 effectively prevents the arm 48 from moving forwardly. Acting as a stop for the arm 48, the link 29 thus locks the arm 48 against forward movement. Then, by retracting the cylinder slightly, pressure on the pins 55 and 55a is relieved, after which the pins may readily be removed and the cylinder disconnected from the implement.

The flow of material from the fertilizer compartment 12 of the hopper 11 is controlled by means of a bottom slide 65. As best shown in Fig. 2, this member comprises an elongated part having a plurality of openings 66 therein cooperating with openings 67 formed along the bottom of the hopper compartment 12. The bottom slide 65 is held detachably along the bottom of the hopper by a pair of elongated supporting clips 68 and 68a, each formed to engage an edge 69 of the bottom slide, each edge being turned downwardly and seating in a trough or groove 71 formed in the two supporting members 68 and 68a. The former member is made detachable with respect to the hopper, and to this end the support 68 is provided with a plurality of diagonal slots 73 engageable with bolts 74 carried by the front side of the hopper 11. By removing thumb nuts 76 from the several bolts 74, the slide support 68 may be dropped downwardly, thereby providing for the ready removal of the bottom slide from the other support member 68a. Also, by shifting the slide support 68 in one direction or the other, the latter may be tightened or loosened relative to the hopper bottom so as to hold the bottom slide snugly in position while yet accommodating sliding or shifting movement. The latter movement is for the purpose of controlling or varying the flow of material from the hopper, and the means to shift the bottom slide 65 includes a nut member 77 pivoted to a bracket 78 that is fixed to the bottom slide 65. Threaded into the nut member 77 is an adjusting rod 79 that is rotatably anchored to a bracket 81 fixed to the adjacent end of the hopper, and outwardly of the bracket 81, the adjusting rod 79 carries a hand wheel 82 whereby turning of the rod 79, to shift the bottom slide 65 in one direction or the other, is facilitated.

Mounted on the bottom slide 65 is a shut-off slide 90. The latter slide is in the form of an elongated member and is shiftable along the lower side of the bottom slide in a longitudinal direction and is provided with openings 91 adapted to be moved into and out of registry with the openings in the bottom slide and the hopper bottom, whereby to accommodate controlled discharge of material from the hopper or to shut off all flow therefrom. The shut-off slide 90 is held in position laterally of the bottom slide 65 between pairs of brackets 93 and 94, the brackets also serving as supports for the associated spouts 96 to which the flexible tubes 97 that deliver the material to furrow openers 98, are connected. The shut-off slide 90 is releasably held against the bottom of the bottom slide 65 by means of springs 101. Each spring is connected to a pair of studs 102 or other suitable fasteners by which the ends of the springs 101 are detachably connected with the bottom slide 65. By removing the springs 101 from the bottom slide, the shut-off slide may readily be dropped away from the bottom slide, as for cleaning or the like.

According to the principles of the present invention the shut-off slide 90 is arranged to be moved back and forth, between open and closed position, by means of a connection with the raising and lowering means. The grain drill of the present invention is of the type in which substantially the entire structure is raised and lowered when the furrow openers 98 are raising and lowered, which provides the advantage that in the lowered or operating position of the furrow openers, substantially the entire weight of the implement may be imposed on the furrow openers so as to insure their penetration to the desired depth. Accordingly, the cylinder C and associated parts may be considered as furrow opener raising and lowering means, and it is to such means that the mechanism for shifting the shut-off slide is connected, as mentioned above.

Secured to the shut-off slide 90 is an elongated generally U-shaped member 106. This member includes ends 107 and 108, and a generally central interconnecting section 109. The ends 107 and 108 are apertured so as to be loosely received on studs 111 fixed to the shut-off slide 90. A tension spring 113 is connected at its outer end, as by a cotter pin 114, to the central portion 109 of the yoke or U-shaped member 106 by means of a strap 115, welded to the central section 109. The outer end of the strap 115 is apertured to receive the cotter pin 114. The inner end of the spring 113 is anchored to a pulley bracket 118 that is secured, as by bolts 119, to an adjacent portion of the hopper 11. Generally, the pulley bracket 118 is located between the end portions of the elongated yoke 106, and the inner end of the spring is connected to the bracket 118 at a point above the connection of the spring with the member 106, which underlies the bracket. The spring 113 therefore exerts a component of force that normally holds the member 106 up against the lower portion of the pulley bracket 118.

The bracket 118 supports a pulley 121 over which a cable 122 is passed. The adjacent end of the cable is extended through an opening in a bolt 124, the latter being inserted in an opening in the central portion 109 of the yoke 106 so that when the nut 125 is tightened, the cable end is secured firmly to the member 106, this connection being made generally at the end of the member 106 opposite the end to which the outer end of the spring 113 is connected.

By virtue of the construction just described, when a pull is exerted on the cable 122, the yoke member 106, and the shut-off slide being connected therewith, is shifted in one direction against the tension of the spring 113, and when the pull exerted on the cable 122 is released, the tension of the spring 113 acts to shift the member 106 and the associated shut-off slide 90 in the other direction. Preferably, the spring 113 is arranged to move the shut-off slide 90 to its open position, and a pull exerted through the cable 122 is arranged to close the shut-off slide, thereby preventing any flow of material from the hopper compartment 12.

As will best be seen from Fig. 1, the cable 122 is extended forwardly to cable-receiving means in the form of a sheave 128 carried at the rear end of a rod 129, the forward end of which is connected, as at 131, to a manually operated auxiliary control lever 132. From the sheave 128 the cable 122 is then extended backwardly or rearwardly to a point of connection, as at 134, with the lift arm 44. When the manual operated lever 132 is in the position shown in Fig. 1, whenever the cylinder is operated to raise the front furrow openers, and other associated grain drill structure, the resulting rearward movement of the arm 44 exerts a pull through the cable and thereby automatically shifts the shut-off slide in a direction to close the slide. Thus, whenever the grain drill is raised into a transport position the shut-off slide is automatically moved into a shut-off or closed position. When the grain drill is lowered into an operating position, the pull on the cable 122 is released, and the spring 113 then acts automatically to shift the shut-off slide into its open position permitting material to be dispensed from the hopper, under the control of the adjustable bottom slide 65. The laterally inner end of the strap 115 is bent, as at 133 (Fig. 2), to form a stop that engages the pulley bracket 118 when the spring 113 shifts the shut-off slide 90 into its open position.

The shut-off slide 90 may also be moved into its closed position, irrespective of the position of the furrow openers, by means of the auxiliary or shut-off lever 132. The cable connection 131 to the lever 132 is disposed a distance above the pivotal mounting, as at 135, of the lever 132 on the upper end of its support 136, and therefore whenever the hand lever 132 is swung into a forward position, as shown in dotted lines in Fig. 1, a pull is exerted through the rod 129 against the sheave 128, thereby pulling through the cable 122 and shifting the shut-off slide into its closed position. The parts are so arranged, in association with a stop 138 that limits the downward movement of the hand lever 132 to the position shown in dotted lines, that in the dotted line position of the hand lever 132, the latter is disposed in an over-center position whereby the normal tension exerted on the rod 129 and cable 122 by the spring 113 serves to hold the lever 132 in its over-center or shut-off position. The lever support 136 is re-enforced by a diagonal brace 137, both parts being mounted on the draft frame 21.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A material dispenser including a frame, a hopper on said frame, a shut-off slide carried by the hopper, and means for controlling said shut-off slide comprising a yoke connected with said slide, a spring connected at one end with said yoke for moving the slide in one direction, a bracket carried by said hopper and disposed adjacent said yoke generally between spaced portions thereof, said spring being connected at said one end to one of said yoke portions and said bracket receiving the other end of said spring, a cable including an end portion extending alongside the yoke generally in line with said spring and connected with said yoke at the other of said spaced apart portions to move the slide in the other direction, means connecting the cable and bracket to cause the cable to react against the bracket at a point adjacent said yoke, and means movably carried by said frame and connected with said cable at a point spaced from said end portion to exert a pull on the cable.

2. A material dispenser including a frame, a hopper on said frame, a shut-off slide carried by the hopper, and means for controlling said shut-off slide comprising a yoke connected with said slide and extending generally longitudinally of the slide, a spring connected at one end to one end of the yoke for moving the slide in one direction, a bracket fixed to said hopper and located generally between the ends of said yoke, a portion of the bracket extending to a point adjacent said yoke, a pulley carried by said bracket portion, a cable trained over said pulley and connected with the other end of said yoke to move the slide in the other direction, and means movably carried by said frame and connected with said cable at a point spaced from its connection with said yoke to exert a pull on the cable.

3. In a material dispenser, a frame, a hopper carried by said frame and having discharge openings in the bottom portion thereof, an adjustable bottom slide carried along the bottom of the hopper and having openings adapted to be shifted into various degrees of registry with said discharge openings so as to provide for varying the rate of discharge therethrough, a shut-off slide movably carried by said bottom slide and having openings adapted to be shifted into and out of registry with said bottom slide openings, movable furrow opening means connected with the frame, means carried by the frame and connected to raise and lower said furrow opening means, a pair of separably operable instrumentalities movably carried by said frame and each connected to shift said shut-off slide, means connecting one of said instrumentalities with said raising and lowering means to shift said shut-off slide into a closed position whenever said furrow openers are raised, means whereby the other instrumentality acts to shift said shut-off slide into closed position, independently of the position of said furrow opener raising and lowering means, and means incorporated in said other instrumentality for releasably locking said shut-off slide in closed position.

4. Means for controlling the shut-off slide of an implement having a frame, a hopper carried by said frame and a shut-off slide carried by the hopper, said means including a pulley bracket carried by said frame, a spring connected at one end with said slide at a point disposed at one side of said bracket, means connecting the other end of said spring with said bracket, a pulley mounted on said bracket, a cable passed over said pulley, means connecting one end of said cable with said slide at a point disposed at the other side of said bracket, and means movably carried by said frame and connected with the other end of said cable for moving the latter.

5. Means for controlling an operative part of a material dispenser or the like having a frame, a furrow opening means movably carried by said frame, and means carried by said frame and connected with said furrow opening means to raise and lower the latter, said part being shiftable relative to the frame from one position to another, said controlling means comprising a spring connected between said frame and said part to shift said part in one direction, a cable movably carried by the frame and connected adjacent one end with said part to shift the latter in the other direction, means connecting the other end of said cable with said furrow opener shifting means, an auxiliary operating means for shifting said part in said one direction independently of the position of said furrow opener shifting means, said auxiliary operating means comprising a movable part including a pulley carried by said movable part and receiving an intermediate portion of said cable, said pulley accommodating movement of the cable resulting from movement of said furrow opener shifting means, and means connected with the movable part of said auxiliary operating means to shift said pulley.

6. In a material dispenser or the like having a frame, a hopper carried thereby and a material flow controlling bottom slide movably carried by the lower portion of the hopper, the combination of a shut-off slide, means movably mounting the shut-off slide on the bottom slide, a slide-shifting member comprising an elongated generally U-shaped part having its ends loosely connected with said shut-off slide, a pulley bracket adapted to be mounted on the hopper above the generally central portion of said elongated part, said U-shaped part having a generally central portion being spaced outwardly of the hopper from said shut-off slide, a pulley on said bracket above said slide-shifting member, a cable passed over said pulley and connected adjacent one end to one end portion of said slide-shifting member, a tension spring connected between said bracket and the other end portion of said elongated member and acting to move said shut-off slide in one direction, a pull on the other end of said cable serving to shift said member and shut-off slide in the other direction, the spring being connected with the bracket at a point above the slide-shifting member, whereby the tension in said cable and spring acts to hold the central portion of said slide-shifting member up against said pulley bracket, and means carried by the frame and connected with said other end portion of the cable to exert a pull thereon.

7. In a material dispenser including a support, a hopper, a shut-off slide therefor, and means for controlling said shut-off slide comprising a spring connected between said support and said slide to open said shut-off slide, a cable connected at one end with said slide whereby a pull on said cable closes said shut-off slide against the force exerted by said spring, and first and second separately operable force-exerting means acting against said cable at spaced apart points adjacent the other end of the cable, and each of said first and second force-exerting means reacting through the cable against the other to shift said shut-off slide independently of one another, one of said force-exerting means comprising an oscillatable part carried by said support and connected with said other end of the cable and the other force-exerting means comprising a part pivotally mounted on said support, means movably receiving an intermediate portion of the cable connected with said pivoted part, to shift the cable against the tension of said spring, and overcenter means connected with said pivoted part for releasably holding said pivotally mounted part in one position.

8. In a material dispenser, a frame, an auxiliary flow controlling cut-off means movable relative to the frame into open and shut positions, a spring connected between said frame and said cut-off means to open said cut-off means, furrow opener raising and lowering means carried by said frame, means connected with said furrow opener raising and lowering means and with said cut-off means for moving the latter against the bias exerted by said spring, said connecting means including a cable and movable cable-receiving means over which the cable is trained, whereby movement of said furrow opener raising and lowering means in the furrow opener raising direction acts to shift said cut-off means in the closing direction, and means connected with said cable-receiving means and movable independently of said raising and lowering means for shifting said cable-receiving means so as to close said cut-off means when said raising and lowering means moves in a furrow opener lowering direction.

References Cited in the file of this patent

UNITED STATES PATENTS

| | | |
|---|---|---|
| 508,321 | Johnson | Nov. 7, 1893 |
| 1,294,629 | Davis | Feb. 18, 1919 |
| 2,410,937 | Harder | Nov. 12, 1946 |
| 2,685,384 | Tanke | Aug. 3, 1954 |
| 2,687,307 | Austermiller | Aug. 24, 1954 |
| 2,762,535 | Kriegbaum | Sept. 11, 1956 |
| 2,768,773 | Bjerre | Oct. 30, 1956 |
| 2,854,172 | Buhr et al. | Sept. 30, 1958 |
| 2,890,666 | Schnell | June 16, 1959 |
| 2,890,667 | Loomans | June 16, 1959 |